(12) United States Patent
Kitte et al.

(10) Patent No.: US 9,102,306 B2
(45) Date of Patent: Aug. 11, 2015

(54) PEDESTRIAN AIRBAG APPARATUS

(71) Applicant: TOYODA GOSEI CO., LTD., Kiyosu-shi, Aichi-ken (JP)

(72) Inventors: Hajime Kitte, Kiyosu (JP); Takashi Sasaki, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 14/462,923

(22) Filed: Aug. 19, 2014

(65) Prior Publication Data

US 2015/0090516 A1 Apr. 2, 2015

(30) Foreign Application Priority Data

Sep. 30, 2013 (JP) ................................. 2013-204271

(51) Int. Cl.
*B60R 21/34* (2011.01)
*B60R 21/36* (2011.01)
*B60R 21/2338* (2011.01)

(52) U.S. Cl.
CPC ....... *B60R 21/36* (2013.01); *B60R 2021/23382* (2013.01); *B60R 2021/346* (2013.01)

(58) Field of Classification Search
CPC .............. B60R 21/36; B60R 21/23316; B60R 21/23324; B60R 21/2338; B60R 21/23382
USPC ........................................ 180/274; 280/743.1
See application file for complete search history.

(56) References Cited

U.S. PATENT DOCUMENTS

| 6,923,286 | B2 * | 8/2005 | Sato et al. ................... 180/274 |
| 2007/0114090 | A1 * | 5/2007 | Okamoto et al. ............ 180/274 |
| 2009/0014988 | A1 * | 1/2009 | Takimoto et al. .......... 280/730.1 |

(Continued)

FOREIGN PATENT DOCUMENTS

| DE | 102005041274 | * | 3/2006 |
| JP | 2006-327360 A | | 12/2006 |
| WO | WO 2012101196 A1 | * | 8/2012 |

OTHER PUBLICATIONS

Tokita et al., Airbag for non-occupant e.g. pedestrian, protection device in motor vehicle, has connecting section connecting gas chambers of which one is inflated with gas to push hood upwards while section of column is covered, Mar. 9, 2006, German Patent Office, DE 10 2005 041 274 A1, English Abstract.*

(Continued)

*Primary Examiner* — James English
(74) *Attorney, Agent, or Firm* — Posz Law Group, PLC

(57) ABSTRACT

A pedestrian airbag apparatus includes a folded airbag and an inflator that supplies an inflation gas to the airbag. Upon completion of the inflation, the airbag includes a transversal inflation portion, two longitudinal inflation portions, and partitions including end-side partitions arranged to extend from both left and right ends of the transversal inflation portion inward in the left and right direction and thus to block front side regions of the longitudinal inflation portions. The airbag further includes tethers limiting a spacing distance from a storage portion for the airbag by connecting proximal portion sides of the tethers to regions on distal end sides of the end-side partitions and connecting distal end sides of the tethers to the storage portion.

3 Claims, 12 Drawing Sheets

(56) References Cited

U.S. PATENT DOCUMENTS

| | | | |
|---|---|---|---|
| 2009/0102167 A1* | 4/2009 | Kitte et al. | 280/728.2 |
| 2010/0244413 A1* | 9/2010 | Hayashi et al. | 280/728.3 |
| 2014/0027195 A1* | 1/2014 | Kalliske et al. | 180/271 |
| 2014/0291054 A1* | 10/2014 | Tanaka et al. | 180/274 |
| 2014/0291055 A1* | 10/2014 | Tanaka et al. | 180/274 |
| 2014/0318881 A1* | 10/2014 | Sugimoto et al. | 180/274 |

OTHER PUBLICATIONS

Tokita et al., Airbag for non-occupant e.g. pedestrian, protection device in motor vehicle, has connecting section connecting gas chambers of which one is inflated with gas to push hood upwards while section of column is covered, Mar. 9, 2006, German Patent Office, DE 10 2005 041 274 A1, Machine Translation of Description.*

* cited by examiner

PEDESTRIAN AIRBAG APPARATUS

CROSS-REFERENCE TO RELATED APPLICATIONS

This application claims the benefit of Japanese Patent Application No. 2013-204271 (filed on Sep. 30, 2013), the entire contents of which are hereby incorporated by reference.

BACKGROUND

1. Technical Field

The present invention relates to a pedestrian airbag apparatus having an airbag configured to cover an upper surface region of a cowl and front surface regions of left and right front pillars upon completion of inflation.

2. Background Art

Conventionally, as a pedestrian airbag apparatus, one has been known in which an airbag thereof includes, upon completion of inflation, a transversal inflation portion arranged substantially along a left and right direction to cover an upper surface extending from a rear end of a hood panel to a lower portion of a front wind shield arranged on a rear side of the hood panel, and two longitudinal inflation portions adapted to extend from both ends of the transversal inflation portion toward the rear side and to cover front surfaces of left and right front pillars. In such a conventional pedestrian airbag apparatus, the transversal inflation portion of the airbag includes partitions intermittently formed substantially along the left and right direction, and gas communication passages penetrated in a front and rear direction in regions between the partitions, and thus an inner region of the transversal inflation portion is partitioned into transversal cell sections arranged side by side in the front and rear direction. Also, in the airbag, a gas inlet connected to an inflator is arranged on the front transversal cell section arranged on the front side, and the front transversal cell section is configured to cover an upper surface of the rear end of the hood panel upon completion of inflation (e.g., see JP-A-2006-327360). In addition, according to the conventional airbag, a tether is arranged to be connected to a storage portion at a location near a connection region of the transversal inflation portion to the longitudinal inflation portions, thereby limiting a spacing distance from the storage portion.

[Patent Document 1] JP-A-2006-327360

However, in such a conventional pedestrian airbag apparatus, the partitions for partitioning the transversal inflation portion are not arranged on regions in front of the longitudinal inflation portions, and thus an inflation gas flowed into the front transversal cell section from the gas inlet is directly introduced into the longitudinal inflation portions from both left and right ends of the front transversal cell section. Therefore, even if the tether is arranged at such a location near the connection region of the transversal inflation portion to the longitudinal inflation portions to limit a spacing distance from the storage portion, because the inflation gas is directly introduced into the longitudinal inflation portions from both left and right ends of the front transversal cell section upon initial inflation of the airbag, it is difficult to inhibit regions (regions on outer edge sides in a vehicle width direction) on proximal portion sides of the longitudinal inflation portions from floating from the storage portion, and accordingly, there is room for improvement in terms of quickly deploying the longitudinal inflation portions while inhibiting floating or fluttering.

Accordingly, in order to solve the above problems, an object of the present invention is to provide a pedestrian airbag apparatus, in which longitudinal inflation portions can be inhibited from floating from a storage portion or from fluttering upon deployment and inflation of an airbag, thereby quickly covering front surfaces of front pillars.

SUMMARY

According to an aspect of the invention, a pedestrian airbag apparatus that is accommodated in a storage portion arranged near a rear end of a hood panel of a vehicle and at a middle side of the hood panel in a left and right direction of the vehicle between left and right front pillars, includes a folded airbag, and an inflator that supplies an inflation gas to the airbag. The airbag includes, upon completion of inflation, a transversal inflation portion arranged substantially along the left and right direction to cover an upper surface extending from the rear end of the hood panel to a lower portion of a front wind shield arranged on a rear side of the hood panel, two longitudinal inflation portions adapted to extend from both ends of the transversal inflation portion toward the rear side and to cover front surfaces of the left and right front pillars, and a gas inlet connected to the inflator are arranged on the transversal inflation portion. The airbag further includes a lower wall portion arranged on a lower surface side of the airbag and an upper wall portion arranged on an upper surface side of the airbag upon completion of inflation. The transversal inflation portion includes partitions configured to couple the lower wall portion with the upper wall portion and intermittently formed substantially along the left and right direction, and gas communication passages penetrated in a front and rear direction of the vehicle in regions between the partitions, and thus an inner region of the transversal inflation portion is partitioned into transversal cell sections arranged side by side in the front and rear direction. The gas inlet is arranged on the front transversal cell section of the transversal inflation portion arranged on the front side of the airbag. The front transversal cell section is arranged to cover an upper surface of the rear end of the hood panel upon completion of inflation. The partitions include end-side partitions arranged to extend from both left and right ends of the transversal inflation portion inward in the left and right direction and thus to block front side portions of the longitudinal inflation portions. The airbag includes tethers limiting a spacing distance from the storage portion of the airbag by connecting proximal portion sides of the tethers to regions on distal end sides of the end-side partitions and connecting distal end sides of the tethers to the storage portion, thereby.

The end-side partitions may divide end portions of the transversal inflation portion in the left and right direction and the front side portions of the longitudinal inflation portions.

According to the pedestrian airbag apparatus of the present invention, partitions for partitioning the transversal inflation portion of the airbag in the front and rear direction include the end-side partitions arranged to extend from both left and right ends of the transversal inflation portion 29 inward in the left and right direction and thus to block regions in front of the longitudinal inflation portions, or in other words, the front transversal cell section of the transversal inflation portion, which is arranged on the front side, is configured so that both left and right ends thereof block the longitudinal inflation portions. Therefore, upon operation of the inflator, the inflation gas flowed into the front transversal cell section through the gas inlet is difficult to flow into the longitudinal inflation portions from both left and right ends of the front transversal cell section, and thus, after flowing into the rear transversal cell section of the transversal inflation portion, which is arranged on the rear side, through the gas communication passages and then toward both left and right sides of the rear transversal cell section along the inside thereof, is introduced into the longitudinal inflation portions, thereby inflating the longitudinal inflation portions. Further, according to pedestrian airbag apparatus of the invention, the tethers extending from the distal ends of the end-side partitions are connected to the storage portion, thereby limiting a spacing distance of such regions from the storage portion. Specifically, according to pedestrian airbag apparatus of the invention, the inflation gas flowed into the airbag through the gas inlet upon operation of the inflator is first introduced into the front transversal cell section and as a result, the front transversal cell section is inflated in a rod shape arranged substantially along in the left and right direction. At this time, the front transversal cell section can be quickly arranged to cover the upper surface of the rear end of the hood panel, because regions near both left and right ends thereof are connected to the storage portion by the tethers so that floating of both left and right ends from the storage portion can be inhibited and thus swaying thereof can be inhibited. Then, in a state where the front transversal cell section has been stably arranged to cover the upper surface of the rear end of the hood panel, the longitudinal inflation portions are inflated as the inflation gas is flowed therein through the gas communication passages and the rear transversal cell section, and therefore, each longitudinal inflation portion can be inflated while a region, in which a proximal portion thereof is located, is supported by parts on the ends of the front transversal cell section, which is being inflated in a rigid rod shape. Thus, each longitudinal inflation portion can be inflated in a state where oscillation causing floating of an outer edge thereof upward, or swaying in the left and right direction is inhibited, and as a result, can be quickly and stably arranged to cover the front surfaces of the front pillars.

Therefore, according to the pedestrian airbag apparatus of the present invention, the longitudinal inflation portions can be inhibited from floating from the storage portion or from fluttering upon deployment and inflation of the airbag, thereby quickly covering the front surfaces of the front pillars.

DETAILED DESCRIPTION

Figure 1:
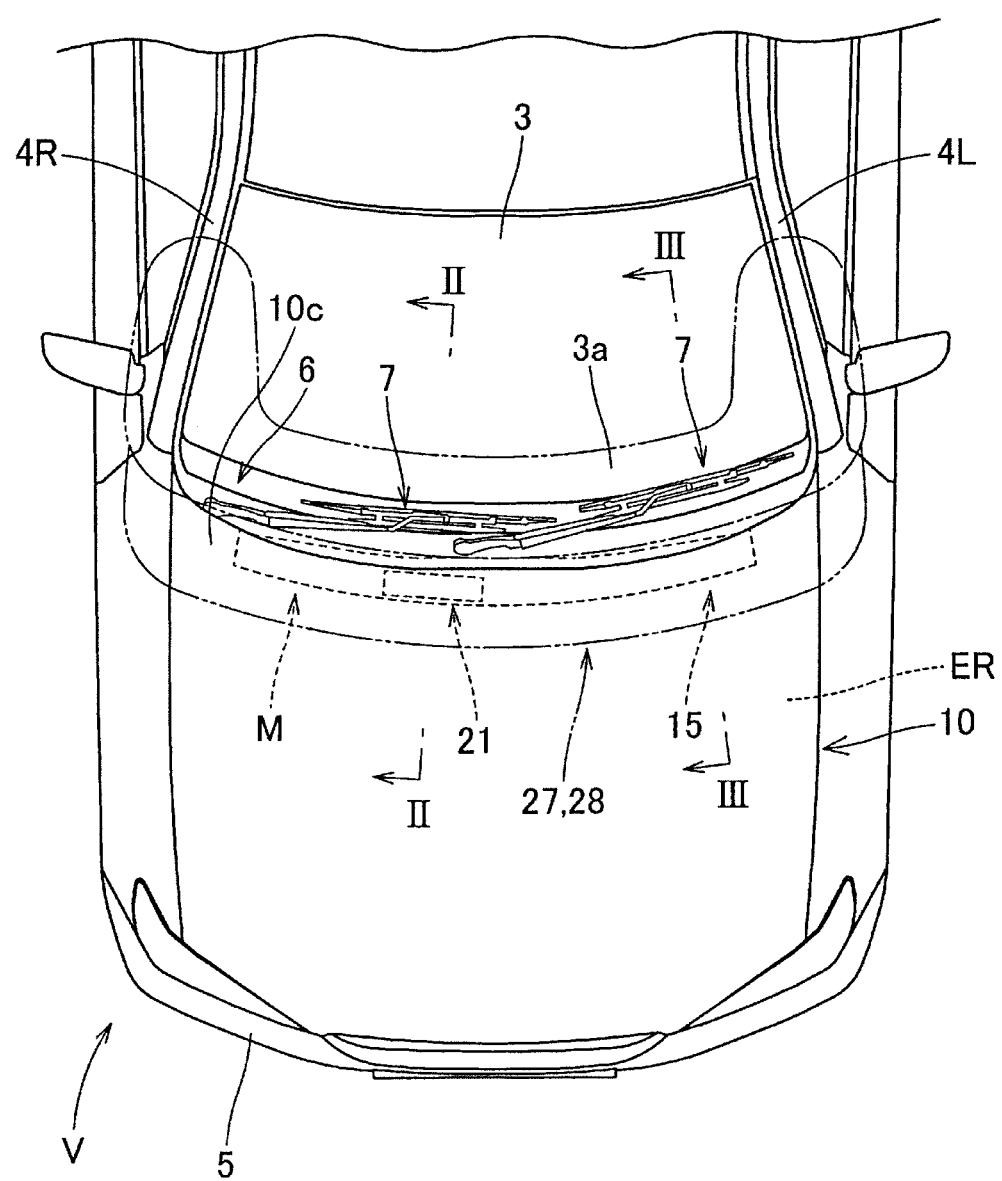
FIG. 1 is a plan view showing a vehicle, in which a pedestrian airbag apparatus according to one embodiment of the present invention is mounted.

One embodiment of the present invention will be now described with reference to the accompanying drawings. As shown in FIG. 1, a pedestrian airbag apparatus M of the embodiment (hereinafter, also simply referred to as the 'airbag apparatus') is arranged at a location on a rear end 10a of a hood panel 10 of a vehicle V, which corresponds to the middle side in a left and right direction of the vehicle V between left and right pillars 4L and 4R. Herein, unless otherwise specified, front and rear, upward and downward, and left and right directions will be respectively described to correspond to front and rear, upward and downward, and left and right directions of the vehicle V.

The embodiment is configured such that a sensor (not shown) for detecting a collision with a pedestrian is installed in a front bumper 5 of the vehicle V (see FIG. 1) and an actuation circuit (not shown), into which a signal from the sensor is inputted, actuates an inflator 21 of the airbag apparatus M when detecting that the vehicle V is collided with a pedestrian, based on the signal from the sensor.

Figure 2:
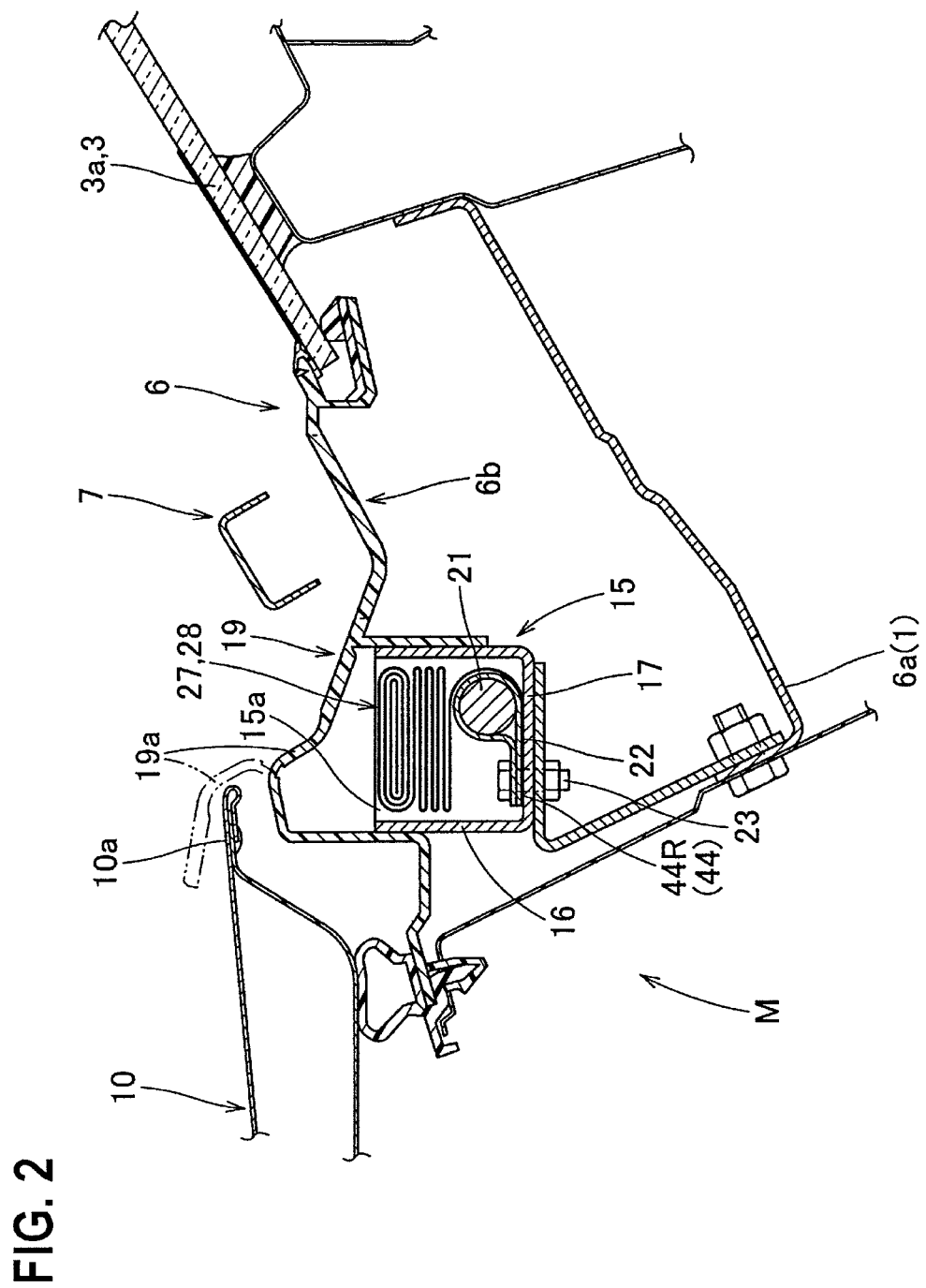
FIG. 2 is a longitudinal sectional view schematically showing the pedestrian airbag apparatus according to the embodiment in the vehicle front and rear direction, corresponding to a section taken along a line II-II in FIG. 1.
Figure 3:
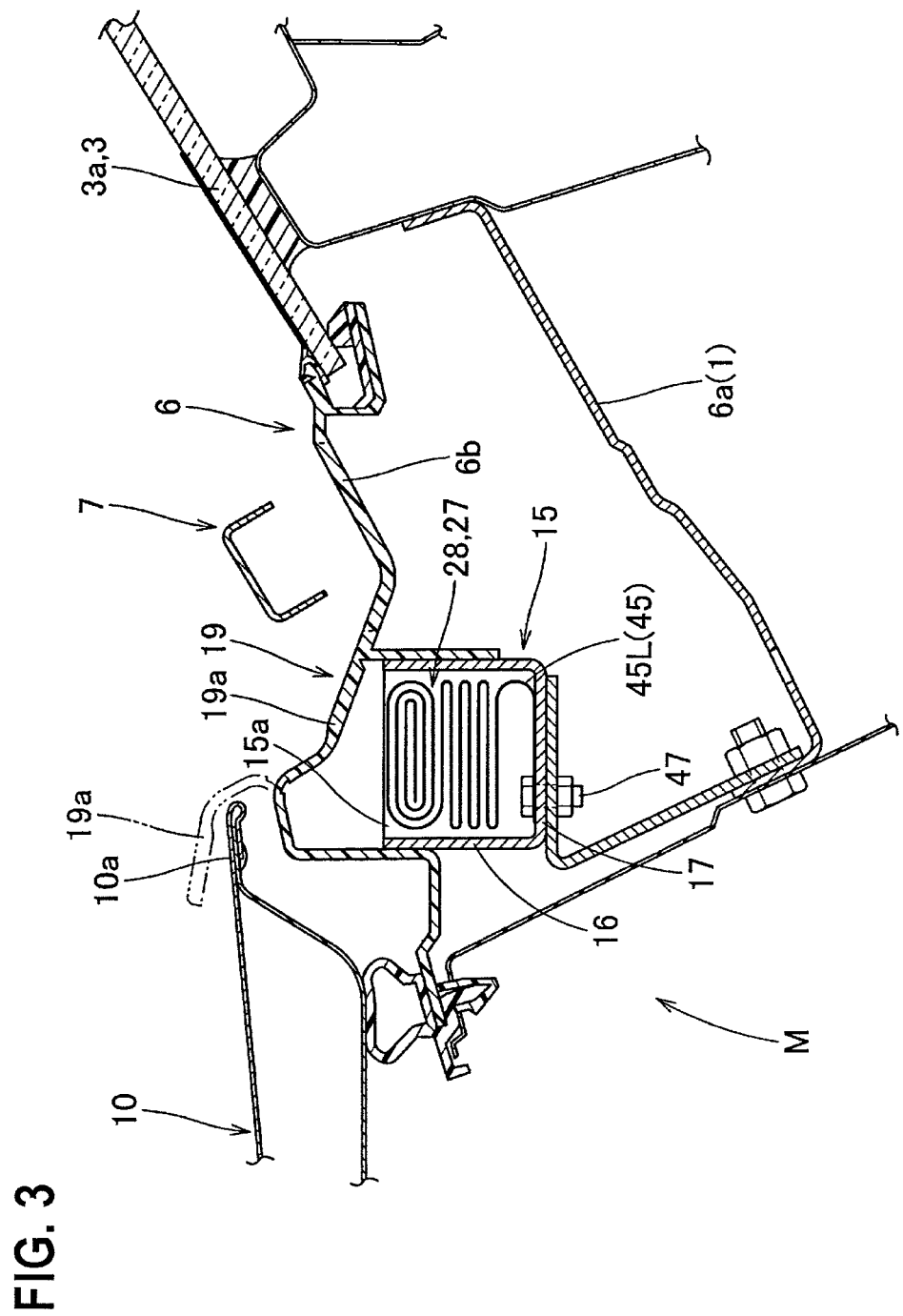
FIG. 3 is a longitudinal sectional view schematically showing the pedestrian airbag apparatus according to the embodiment in the vehicle front and rear direction, corresponding to a section taken along a line III-III in FIG. 1.

As shown in FIGS. 1 to 3, the hood panel 10 is installed to cover an upper side of an engine room ER of the vehicle V, and in the present embodiment, is made of a plate material, such as aluminum (aluminum alloy). The hood panel 10 is curved in the left and right direction to conform to a shape of a front wind shield 3 as described below, so that, as shown in FIG. 1, the middle of the rear end 10a in the left and right direction is located on the front side and both left and right ends thereof are located on the rear side. As shown in FIGS. 2 and 3, a cowl 6 is installed on the rear side of the hood panel 10, and the cowl 6 is constituted of a cowl panel 6a located toward a body 1 and having high rigidity, and a cowl louver 6b located above the cowl panel 6a and made of a synthetic resin. The cowl louver 6b is installed such that a rear end thereof is connected to a lower portion 3a of the front wind shield 3. Similarly, the cowl 6 is also curved in the left and right direction to conform to the curved shape of the rear end 10a of the hood panel 10, so that the middle thereof in the left and right direction is located on the front side and both left and right ends thereof are located on the rear side. Also, as shown in FIGS. 1 to 3, wipers 7 are arranged on a region of the cowl 6 to protrude upward from the cowl louver 6b. As shown in FIG. 1, front pillars 5L and 5R are respectively installed on left and right outsides of the front wind shield 3. In the embodiment, the front wind shield 3 is configured to be curved on a lower edge side thereof in the left and right direction, so that the middle thereof in the left and right direction is located on the front side and both left and right ends thereof are located on the rear side.

As shown in FIGS. 1 to 3, the airbag apparatus M includes the airbag 27, the inflator 21 for supplying an inflation gas to the airbag 27, a case 15 as a storage portion for containing the airbag 27 and the inflator 21, and an airbag cover 19 for covering the folded airbag 27.

In the embodiment, the case 15 as the storage portion made of a sheet metal, as shown in FIGS. 2 and 3, is configured to be formed in a generally box shape having a generally rectangular-barrel-shaped peripheral wall portion 16, which is opened on an upper end side thereof, and a bottom wall portion 17 adapted to close a lower end side of the peripheral wall portion 16, and thus to allow the inflating airbag 27 to protrude out through a protrusion opening 15a on the upper end side thereof. In the embodiment, the case 15 is arranged in the region of the cowl 6 between the hood panel 10 and the wipers 7, and is connected to the cowl panel 6a on the body 1 using brackets (the reference numeral thereof is omitted) extending from the bottom wall portion 17. In the embodiment, the case 15, as shown in FIG. 1, is curved in the left and right direction to conform to the curved shape of the rear end 10a of the hood panel 10, so that the middle thereof in the left and right direction is located on the front side and both left and right ends thereof are located on the rear side. Specifically, the case 15 is configured such that the left and right ends thereof are arranged on a lower portion side of the front pillars 4L and 4R and near an inner side thereof in the left and right direction.

In the embodiment, the airbag cover 19 made of a synthetic resin, as shown in FIGS. 2 and 3, is integrally formed with the cowl louver 6b and arranged to cover the protrusion opening 15a of the case 15, and therefore includes a door portion 19a which can be pushed and opened by the airbag 27 upon deployment and inflation of the airbag 27.

Figure 5:
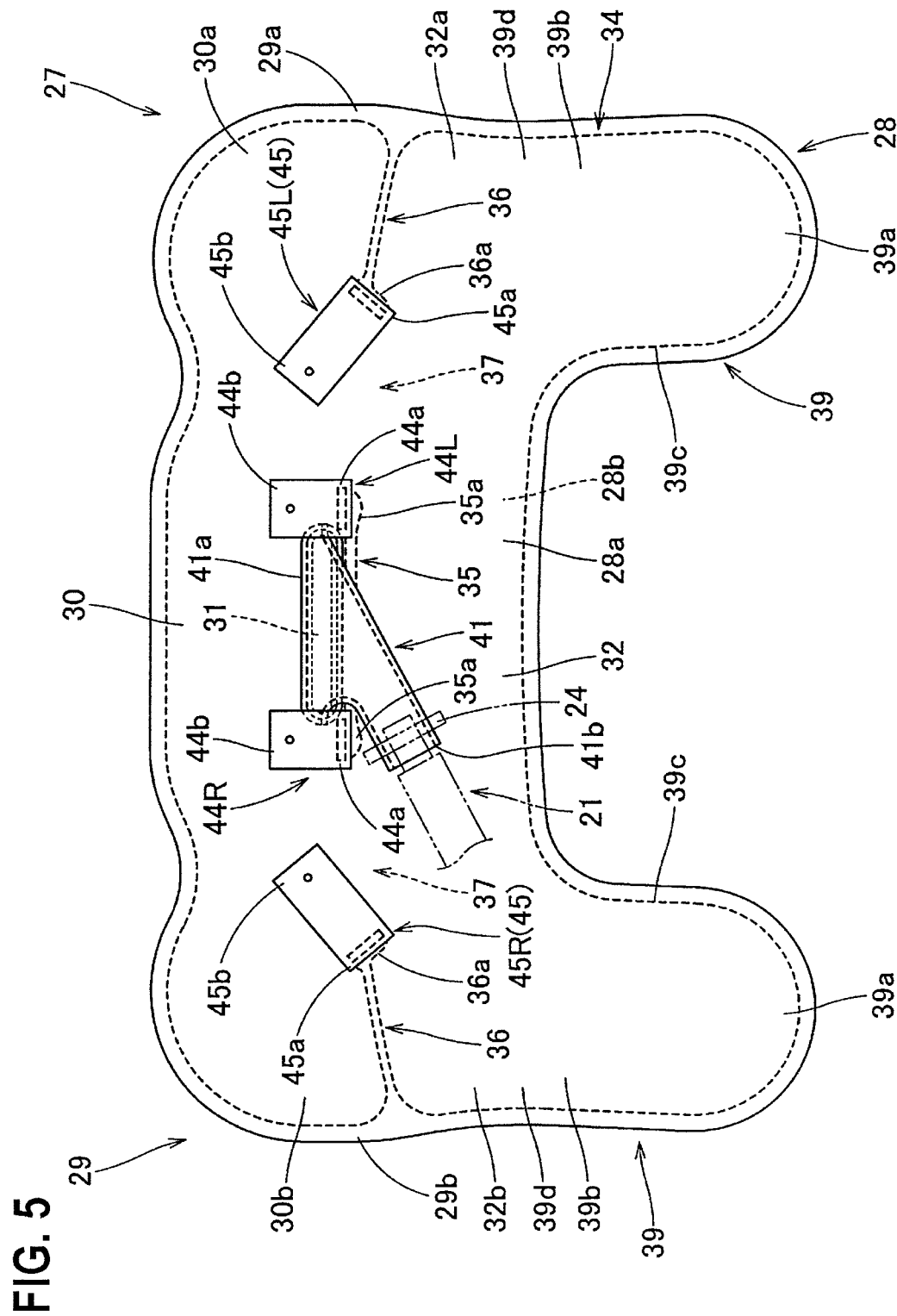
FIG. 5 is a bottom view showing the airbag of FIG. 4.

As shown in FIGS. 1 and 2, the inflator 21 is arranged so that an axial direction thereof extends substantially along the left and right direction and thus an exterior shape thereof is of a cylinder type having a generally circular cylindrical shape. Also, the inflator 21 is arranged at a location which corresponds to the right side with respect to the middle in the left and right direction of the case 15. The inflator 21 is provided with a gas outlet (not shown) which can discharge the inflation gas, on one end side (in the embodiment, the right end side) thereof in the left and right direction and is electrically connected to the actuation circuit via a lead (not shown). As shown in FIG. 2, the inflator 21 is attached to the bottom wall portion 17 by fixing a retainer 22, which is arranged to cover an outer periphery thereof, to the bottom wall portion 17 of the case 15 by bolts 23. In addition, the inflator 21 is adapted such that the left end side thereof having the gas outlet (not shown) is connected to a gas inlet 41 (described below) of the airbag 27, using a clamp 24 (cf., a two-dot chain line in FIG. 5).

The airbag 27, as shown in FIGS. 4 to 7, includes a sack-shaped bag body 28, which can be inflated as the inflation gas is flowed thereinto, the gas inlet 41 protruding from a lower surface of the bag body 28 and connected to the inflator 21, and tethers (middle-side tethers 44 and end-side tethers 45) for attaching the bag body 28 to the case 15.

Figure 6:
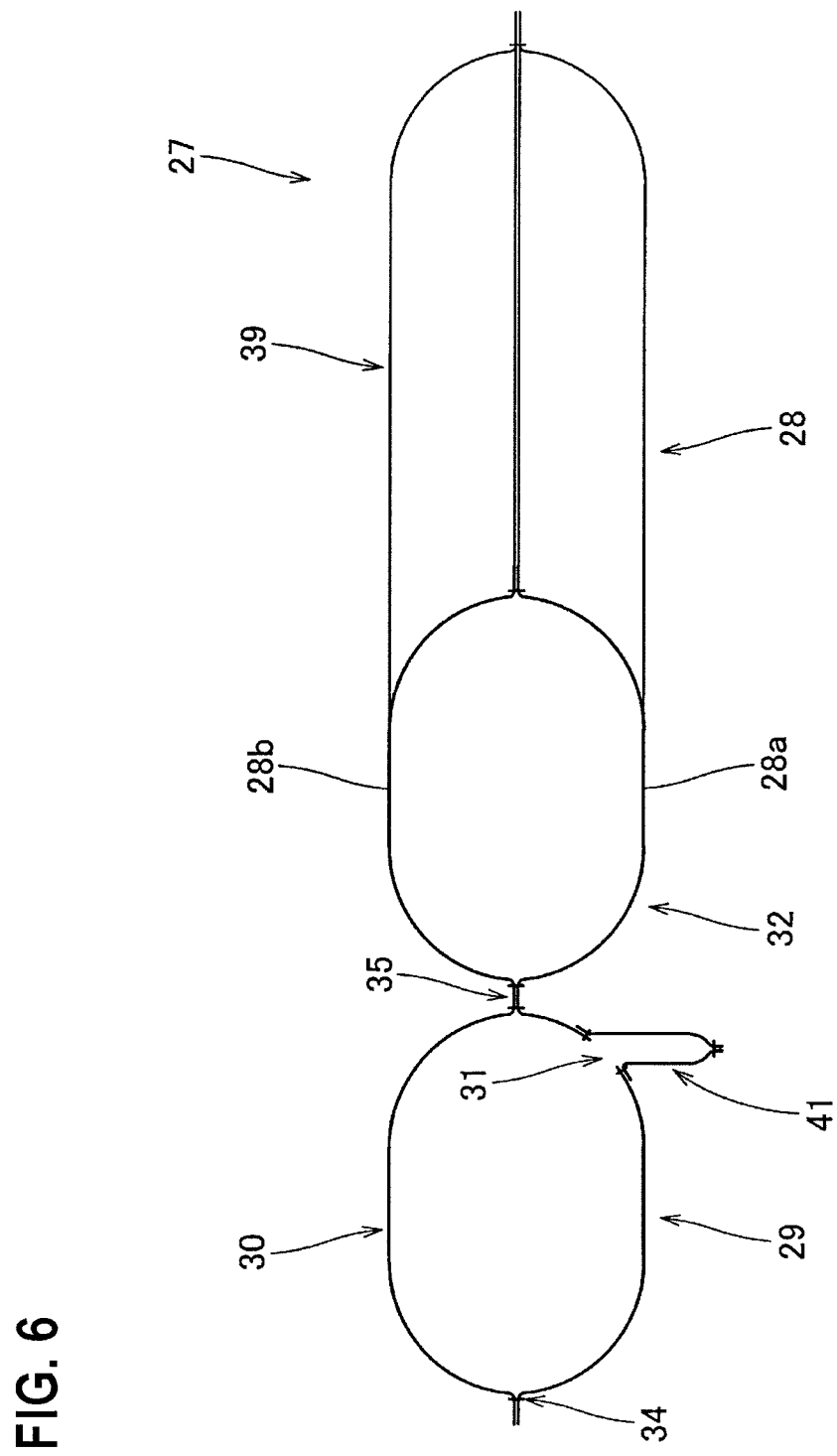
FIG. 6 is a sectional view showing a state where the airbag in FIG. 4 is inflated as a unitary body, corresponding to a section taken along a line VI-VI of FIG. 4.
Figure 7:
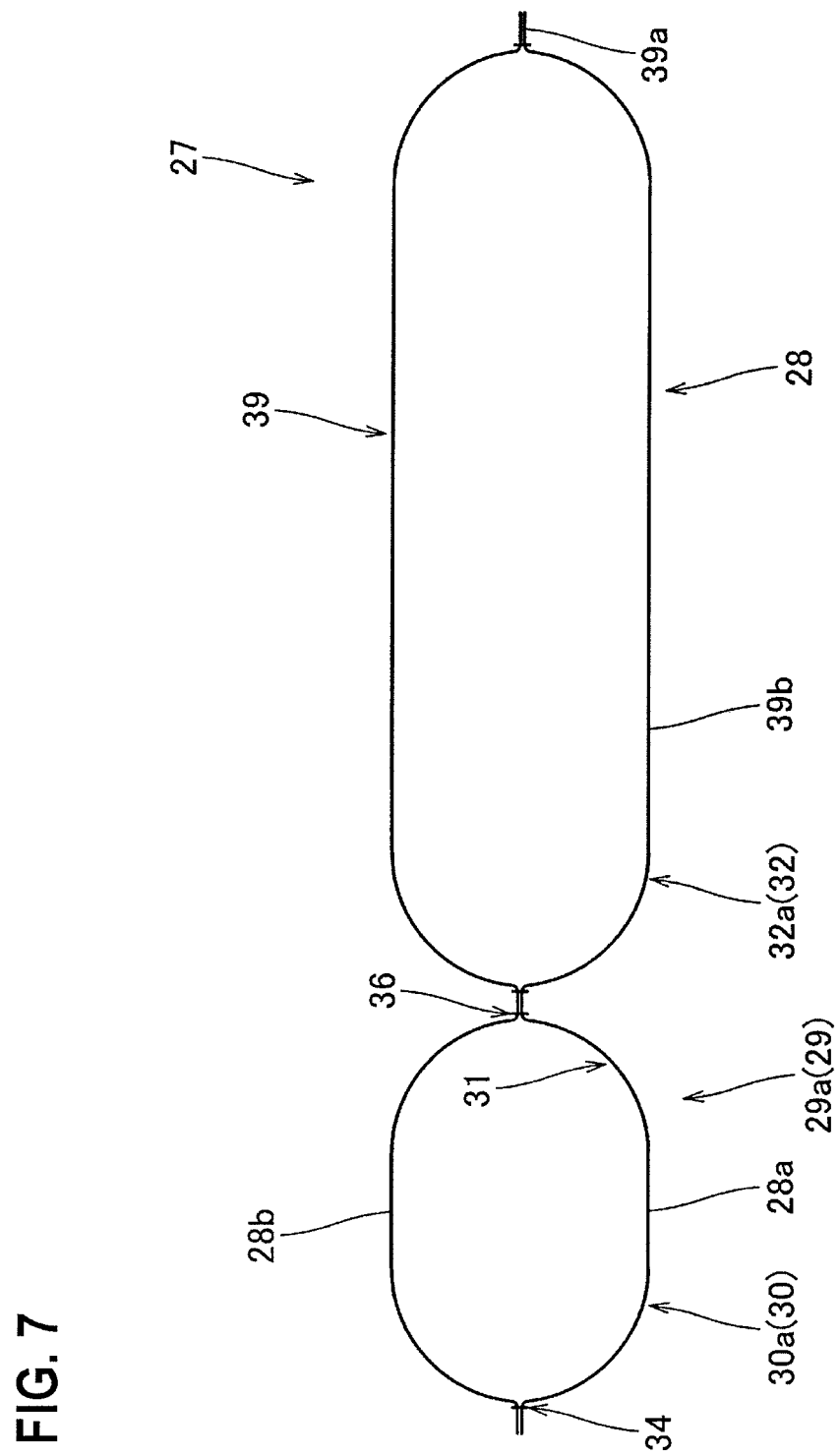
FIG. 7 is a sectional view showing a state where the airbag in FIG. 4 is inflated as a unitary body, corresponding to a section taken along a line VII-VII of FIG. 4.

As shown by a two-dot chain line in FIG. 1 and also shown in FIG. 6, the bag body 28 has a shape upon completion of inflation, which is formed in a generally U shape having a broad width in the left and right direction as viewed from the front, and upon completion of inflation, includes a transversal inflation portion 29 arranged substantially along the left and right direction to extend along the lower portion 3a of the front wind shield 3, and two longitudinal inflation portions 39 and 39 adapted to extend from both ends of the transversal inflation portion 29 toward the rear side and to cover the front surfaces of the left and right front pillars 4L and 4R. In the embodiment, as shown in FIGS. 4 to 7, the bag body 28 has a lower wall portion 28a adapted to be arranged on a lower surface side upon completion of inflation and an upper wall portion 28b adapted to be arranged on an upper surface side, which have substantially the same exterior shape, and is formed in a sack shape by stitching (coupling) peripheral edges of the lower wall portion 28a and the upper wall portion 28b to each other over the entire periphery thereof using a stitching thread.

In the embodiment, the transversal inflation portion 29 is configured to cover an upper surface side of a region extending from a part on the rear end 10a of the hood panel 10 to the lower portion 3a of the front wind shield 3 through the cowl 6, including the wipers 7, upon completion of inflation. Specifically, the transversal inflation portion 29 is configured so that an inner region thereof is partitioned into two transversal cell sections (a front transversal cell section 30 and a rear transversal cell section 32), which are arranged side by side in the front and rear direction, by a middle-side partition 35 and end-side partitions 36 as described below. The front transversal cell section 30 arranged on the front side is configured to cover the upper surface side of the part on the rear end 10a of the hood panel 10 upon completion of inflation, and the rear transversal cell section 32 arranged on the rear side is configured to cover the upper surface side of the region extending from the cowl 6 to the lower portion 3a of the front wind shield 3 upon completion of inflation. In the embodiment, the front transversal cell section 30 and the rear transversal cell section 32 are configured to have substantially the same width dimension (width dimension in the front and rear direction) in a flatly deployed state. On a lower surface side of the front transversal cell section 30, an opening 31 is formed to connect a peripheral edge thereof to the gas inlet 41 and thus to be communicated with the gas inlet 41. Namely, the gas inlet 41 is arranged on the front transversal cell section 30. The opening 31 is formed to be opened in the lower wall portion 28a in a hole shape elongated substantially along the left and right direction, and is provided at a location on the front transversal cell section 30, which corresponds substantially to the middle thereof in the left and right direction, and near a rear end thereof, specifically to be adjacent to a front side of the middle-side partition 35.

Figure 4:
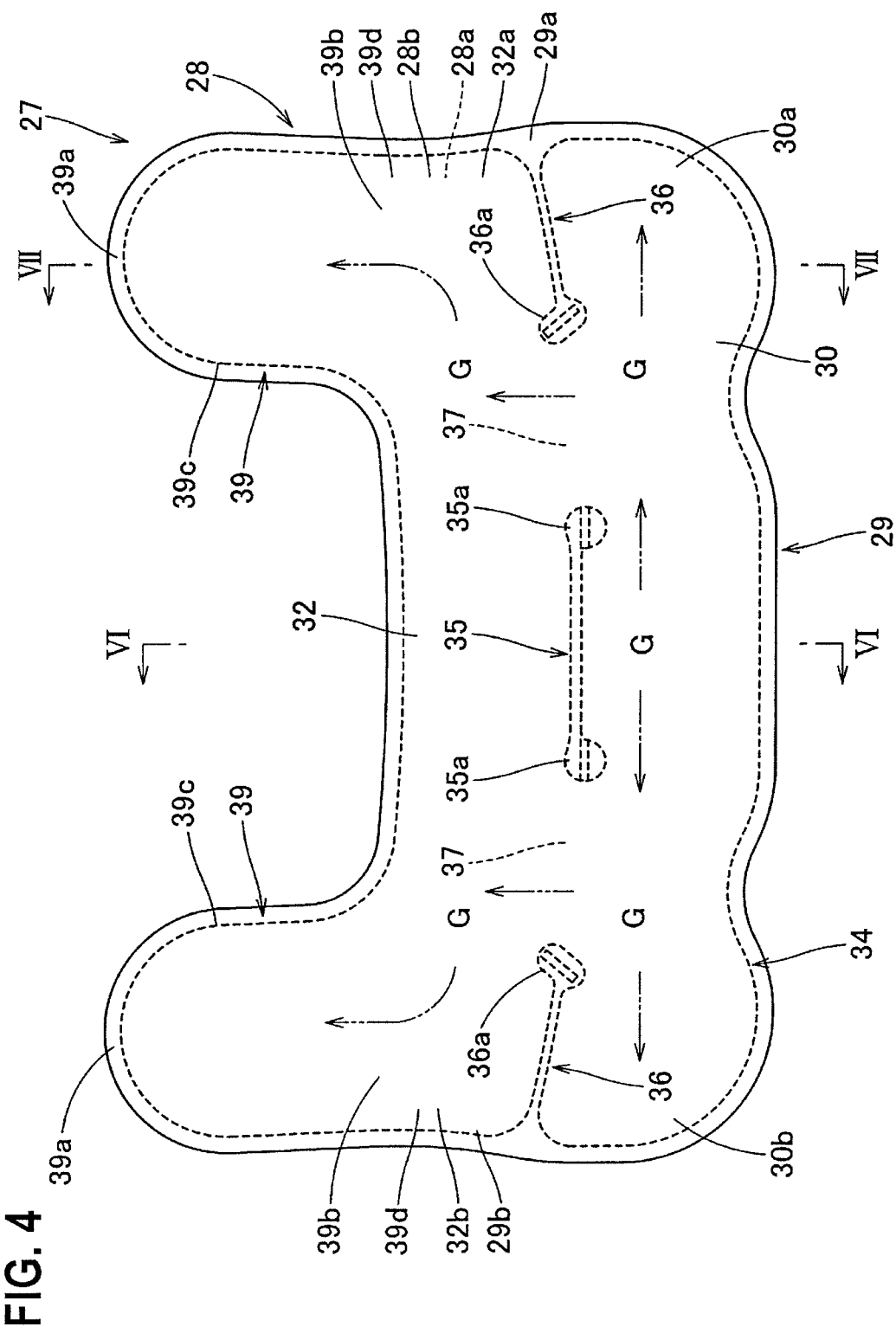
FIG. 4 is a plan view showing a state where an airbag used in the pedestrian airbag apparatus according to the embodiment is flatly deployed.

The middle-side partition 35 and the end-side partitions 36, which are adapted to partition the inner region of the transversal inflation portion 29 in the front and rear direction, are respectively formed by stitching (coupling) the upper wall portion 28b and the lower wall portion 28a, which constitute the bag body 28, to each other using a stitching thread. The end-side partitions 36 are formed to extend inward from both left and right ends 29a and 29b of the transversal inflation portion 29 in the left and right direction, and in the embodiment, are formed to continuously extend from a peripheral edge coupling portion 34, at which outer peripheral edges of the upper wall portion 28b and the lower wall portion 28a are stitched (coupled) to each other. Specifically, each end-side partitions 36 is arranged to block a region in front of the respective longitudinal inflation portion 39. Each end-side partition 36 is formed substantially along the left and right direction, and specifically, is formed in a straight line shape slightly inclined with respect to the left and right direction so that a front end side thereof is oriented to the front side as shown in FIG. 4. Also, each end-side partition 36 is configured so that an end portion 36a on a distal end thereof has a generally broad elliptical shape to prevent stress concentration from occurring upon deployment and inflation of the airbag 27 and the end portion 36a is arranged at a location which is located slightly outward from an inner edge 39c of the respective longitudinal inflation portion 39 in the left and right direction. The middle-side partition 35 is formed at a location, which is located between the end-side partitions 36 and 36, and has a straight line shape extending substantially along the left and right direction substantially at the middle in the left and right direction of the transversal inflation portion 29 and also at a location, which is located slightly in front of the end-side partitions 36. Specifically, the middle-side partition 35 is arranged to be adjacent to a rear side of the opening 31 formed in the front transversal cell section 30 and is formed to provide gaps with respect to the end-side partitions 36 and 36 and at the same time, to have a length dimension in the left and right direction larger than an opening width dimension of the opening 31 formed in the front transversal cell section 30 to extend outward in the left and right direction relative to the opening 31 (see FIG. 8). Similarly, the middle-side partition 35 is also formed so that both left and right end portions 35a have a generally broad circular shape to prevent stress concentration from occurring upon deployment and inflation of the airbag 27. In the embodiment, the middle-side partition 35 and the end-side partitions 36 are configured in substantially left-right symmetry.

Also, in the transversal inflation portion 29 of the embodiment, the gap regions between the middle-side partition 35 and the end-side partitions 36 are respectively penetrated in the front and rear direction to form gas communication passages 37 and 37 for communicating the front transversal cell section 30 with the rear transversal cell section 32. Namely, the gas communication passages 37 are formed at two positions on the left and right side, which are in substantially left-right symmetry. In the embodiment, each gas communication passage 37, as shown in FIG. 4, is configured so that an opening width dimension thereof in a flatly deployed state is substantially identical to a width dimension in the front and rear direction of the front transversal cell section 30 or the rear transversal section 32 in a flatly deployed state.

The longitudinal inflation portions 39 have a width dimension (width dimension in the left and right direction) in a flatly deployed state set slightly larger than the width dimension (width dimension in the front and rear direction) of the front transversal cell section 30 or the rear transversal cell section 32 of the transversal inflation portion 29 in a flatly deployed state, and are configured to cover the front surfaces of the front pillars 4L and 4R upon completion of inflation. Specifically, each longitudinal inflation portions 44 has a length dimension set to a dimension covering the front surfaces of the front pillars 4L and 4R over the substantially entire region.

Figure 8:
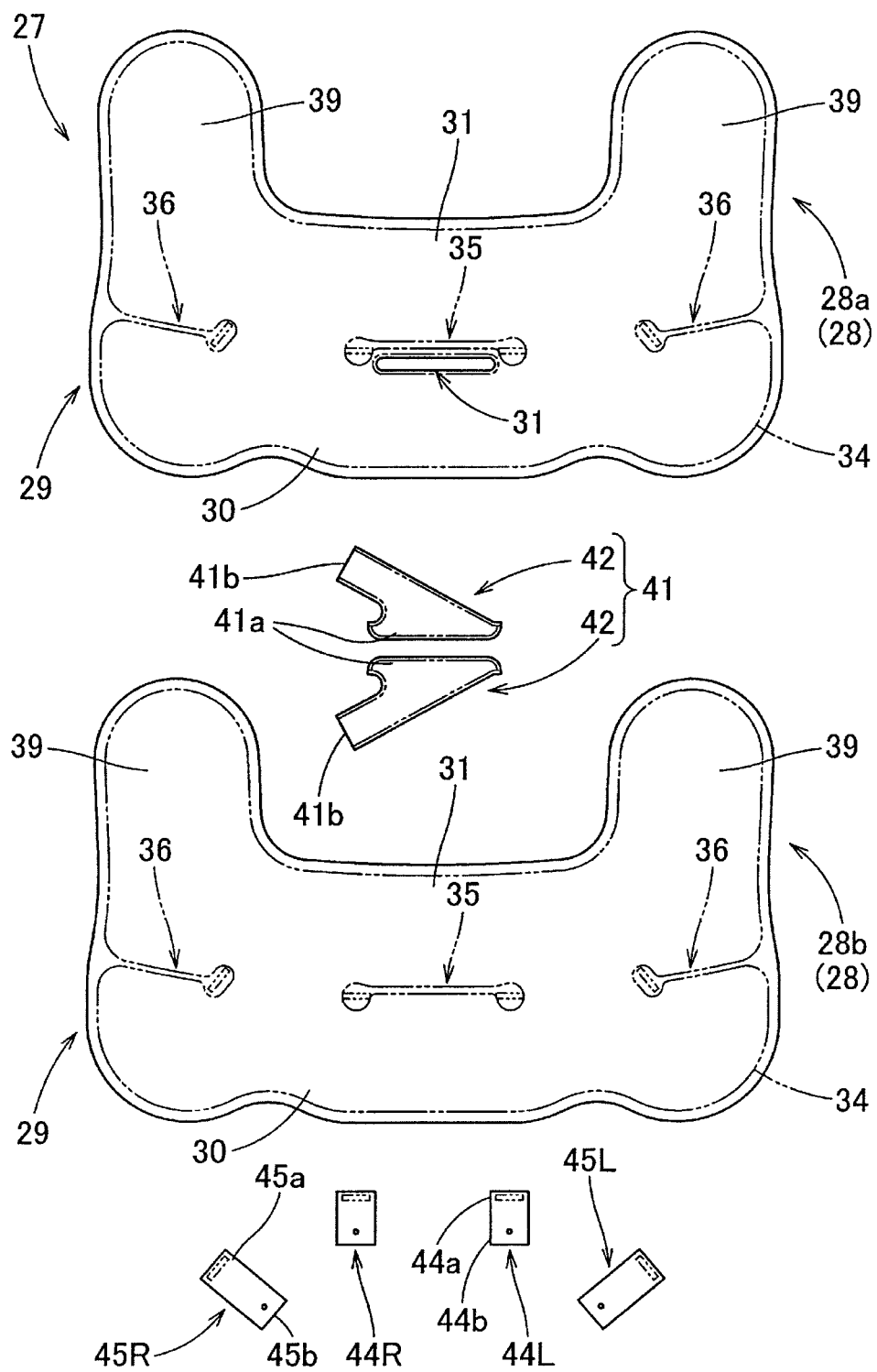
FIG. 8 is a plan view showing arrangement of base materials constituting the airbag in FIG. 4.

In the embodiment, the gas inlet 41 is formed in a generally cylindrical shape as a body separated from the bag body 28, and is connected to the lower surface (lower wall portion 28a) of the bag body 28 by coupling (stitching) a proximal portion 41a thereof to the peripheral edge of the opening 31 formed in the lower wall portion 28a of the front transversal cell section 30 over the entire periphery thereof. The gas inlet 41 is configured to have a distal end 41b opened to be connected to the inflator 21, and in the embodiment, is arranged inclinedly with respect to the front and rear direction so that the distal end 41b is oriented to the right side. Further, in the embodiment, the gas inlet 41, as shown in FIG. 8, is formed by stitching (coupling) outer peripheral edges of two sheets of base materials 42 for the gas inlet, which have the same exterior shape, to each other.

In the embodiment, the end-side tethers 45, which are arranged on end sides in the left and right direction, and the middle-side tethers 44, which are arranged on the middle side in the left and right direction, are arranged as tethers for attaching the bag body 28 to the case 15. Each end-side tether 45 is formed in a band shape and has a proximal portion 45a connected (stitched) to the end portion 36a, which corresponds to the distal end of the respective end-side partition 36 in the lower surface (lower wall portion 28a) of the bag body 28, and a distal end 45b connected to the bottom wall portion 17 of the case 15. In the embodiment, each end-side tether 45 is arranged to extend inclinedly with respect to the front and rear direction so that the distal end 45b is oriented inward in the left and right direction. Each middle-side tether 44 is formed in a band shape and has a proximal portion 44a connected (stitched) to both left and right end portions 35a of the middle-side partition 35 in the lower surface (lower wall portion 28a) of the bag body 28, and a distal end 44b connected to the bottom wall portion 17 of the case 15. In the embodiment, each middle-side tether 44 is arranged to extend substantially along the front and rear direction so that the distal end 44b is oriented forward. The end-side tethers 45 and the middle-side tethers 44 are arranged to limit a spacing distance of the airbag 27, which is being deployed and inflated, from the case 15, and length dimensions thereof are set to have dimensions capable of inhibiting the transversal inflation portion 29 from being floated from the case 15 upon deployment and inflation of the airbag 27. Insertions holes (the reference numeral thereof is omitted), into which bolts as fixing means can be inserted, are formed in the distal ends 44b and 45b of the middle-side tethers 44 and the end-side tethers 45. Also, in the embodiment, the middle-side tether 44R and the end-side tether 45R, which are arranged on the right side, are adapted so that regions located on the distal ends 44b and 45b thereof are attached to the bottom wall portion 17 of the case 15 using the bolts 23 for attaching the inflator 21 to the case 15, whereas the middle-side tether 44L and the end-side tether 45L, which are arranged on the left side, are attached to the bottom wall portion 17 of the case 15 using separate bolts 47 as shown in FIG. 3.

Meanwhile, according to the airbag 27 of the embodiment, the middle-side tethers 44L and 45R are respectively formed to extend from both left and right end portions 35a of the middle-side partition 35, or in other words, two middle-side tethers 44L and 45R are arranged to extend from both left and right sides of a region on the proximal portion side of the gas inlet 41. Also, the middle-side tethers 44 and the end-side tethers 45 are formed to extend from the end portions 35a and 36a of the middle-side partition 35 and the end-side partitions 36, or in other words, each middle-side tether 44 and each end-side tether 45 are respectively arranged to extend from both left and right edges of each of two gas communication passages 37 for communicating the front transversal cell section 30 with the rear transversal cell section 32.

In the embodiment, the bag body 28, the gas inlet 41, the middle-side tethers 44 and the end-side tethers 45 are formed of a coated fabric, in which a coating agent for preventing gas leakage is applied on a woven fabric made of polyester yarn, polyamide yarn or the like.

Figure 9A:
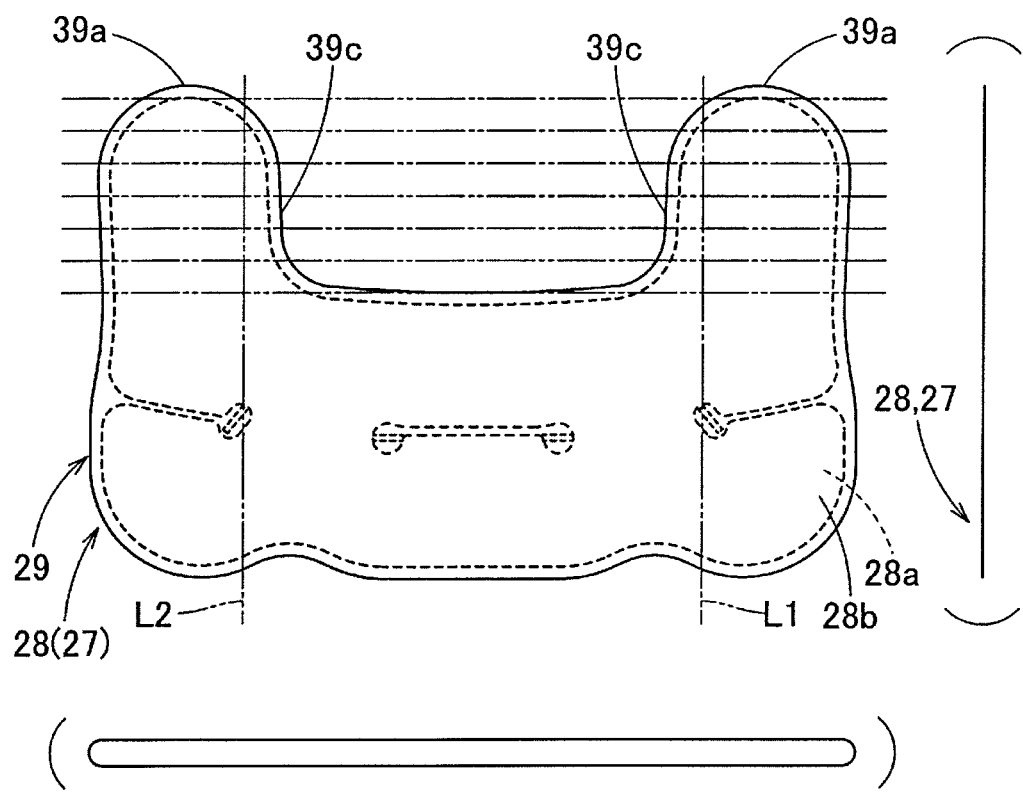
FIGS. 9A and 9B are schematic views explaining a step of folding the airbag of FIG. 4.
Figure 9B:
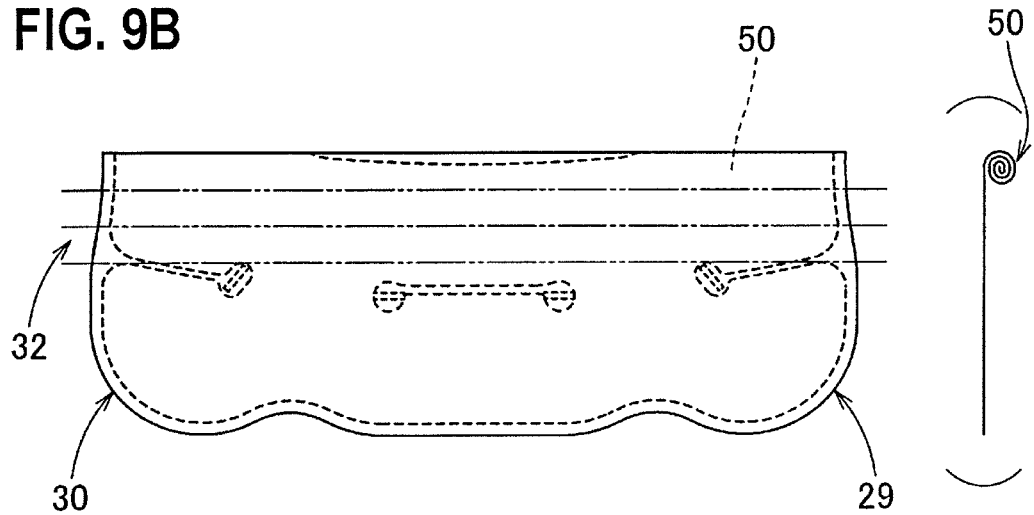
Figure 10A:
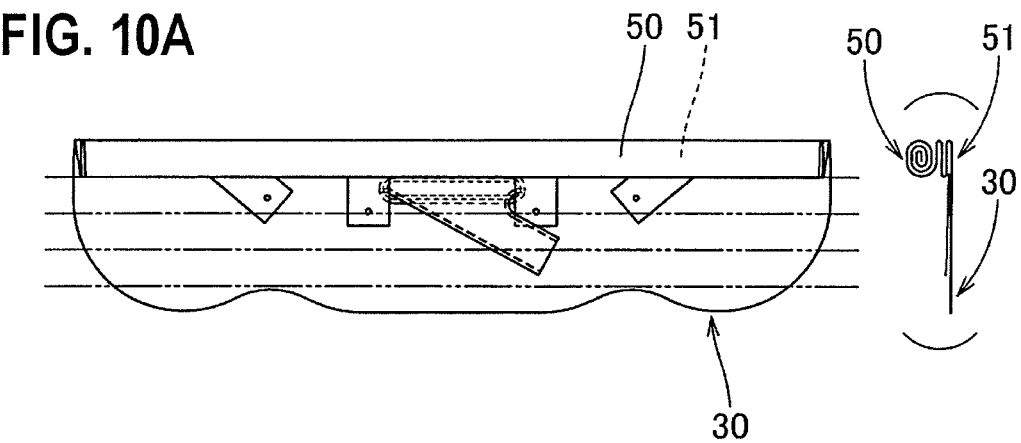
FIGS. 10A to 10C are schematic views explaining a step of folding the airbag of FIG. 4, following the step of FIG. 9B.
Figure 10B:
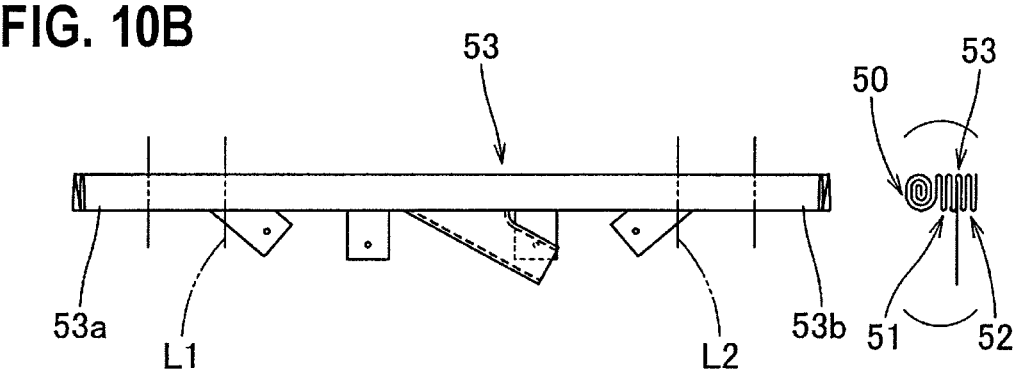
Figure 10C:
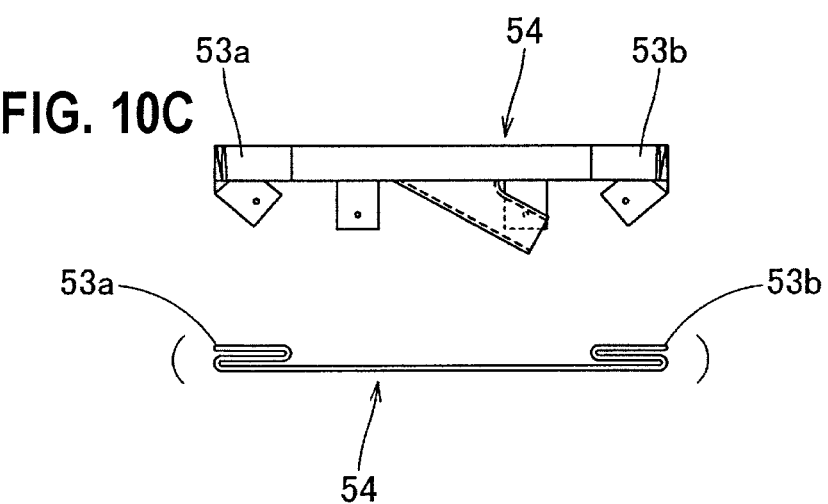

Next, procedures of mounting the airbag apparatus M of the embodiment in the vehicle V will be described. First, the airbag 28 is folded to be receivable in the case 15. In the embodiment, as shown in FIGS. 9A to 10C, the airbag 27 is folded from a flatly deployed state, in which the upper wall portion 28b is overlapped with the lower wall portion 28a, by front-rear shrinkage folding for reducing the width dimension in the front and rear direction, and then by left-right shrinkage folding for reducing the width dimension in the left and right direction. Specifically, as shown in FIGS. 9A and 9B, in the air bag flatly deployed to overlap the upper wall portion 28b with the lower wall portion 28a, regions of the longitudinal inflation portions 39 are first roll-folded to be rolled from distal ends (rear ends) 39a thereof toward the lower wall portion 28a, thereby forming a roll-folded section 50. Then, as shown in FIGS. 9B and 10A, the rear transversal cell section 32 of the transversal inflation portion 29 is accordion-folded to form fold lines along the left and right direction, thereby forming an accordion-folded section 51. Subsequently, as shown in FIGS. 10A and 10B, the front transversal section 30 of the transversal inflation portion 29 is accordion-folded to form fold lines along the left and right direction and thus to be approached to the accordion-folded section 51, thereby forming an accordion-folded section 52 and completing the front-rear shrinkage folding. Then, as shown in FIGS. 10B and 10C, the resulted front-rear shrinkage folded bag 53 is accordion-folded to form fold lines along the front and rear direction and thus to approach both left and right ends 53a and 53b thereof to the middle side in the left and right direction, thereby completing the left-right shrinkage folding and forming the completely folded body 54 receivable in the case 15. Specifically, upon left-right shrinkage folding, the front-rear shrinkage folded bag 53 is folded to form fold lines L1 and L2 along the front and rear direction at locations, which are located more inward in the left and right direction than the proximal portions 45a of the end-side tethers 45 and 45, i.e., near the inner edges 39c of the longitudinal inflation portions 39 and 39 (see FIGS. 9A and 10B).

After the airbag 27 is completely folded, a breakable wrapping material for preventing collapsing of the folded state is wrapped around the completely folded body 54. In this time, a region on the distal end 41b side of the gas inlet 41 and regions on the distal ends 44b and 45b side of the middle-side tethers 44 and the end-side tethers 45 are left exposed from the wrapping material. Then, the inflator 21 retained by a retainer 22 is connected to the distal end 41b of the gas inlet 41 using the clamp 24. Also, the bolts 23 extending from the retainer 22 are inserted through the insertion holes (the reference numeral thereof is omitted) in the distal ends 44b and 45b of the middle-side tether 44L and the end-side tether 45L which are located on the left side, and the bolts 47 are inserted through the insertion holes (the reference numeral thereof is omitted) in the distal ends 44b and 45b of the middle-side tether 44R and the end-side tether 45R which are located on the right side. Next, the inflator 21 and the airbag 27 are received in the case 15 such that each of bolts 23 and 47 protrudes from the bottom wall portion 17 of the case 15, and then, nuts (the reference numeral thereof is omitted) are fastened on each of bolts 23 and 47 protruded from the bottom wall portion 17. In this way, the airbag 27 and the inflator 21 can be kept received in the case 15.

Next, the case 15 is attached to the cowl panel 6a using brackets (the reference numeral thereof is omitted), the airbag cover 19 is attached to the case 15, and finally the cowl louver 6b is attached. Then, the airbag apparatus M can be mounted in the vehicle V.

Figure 11:
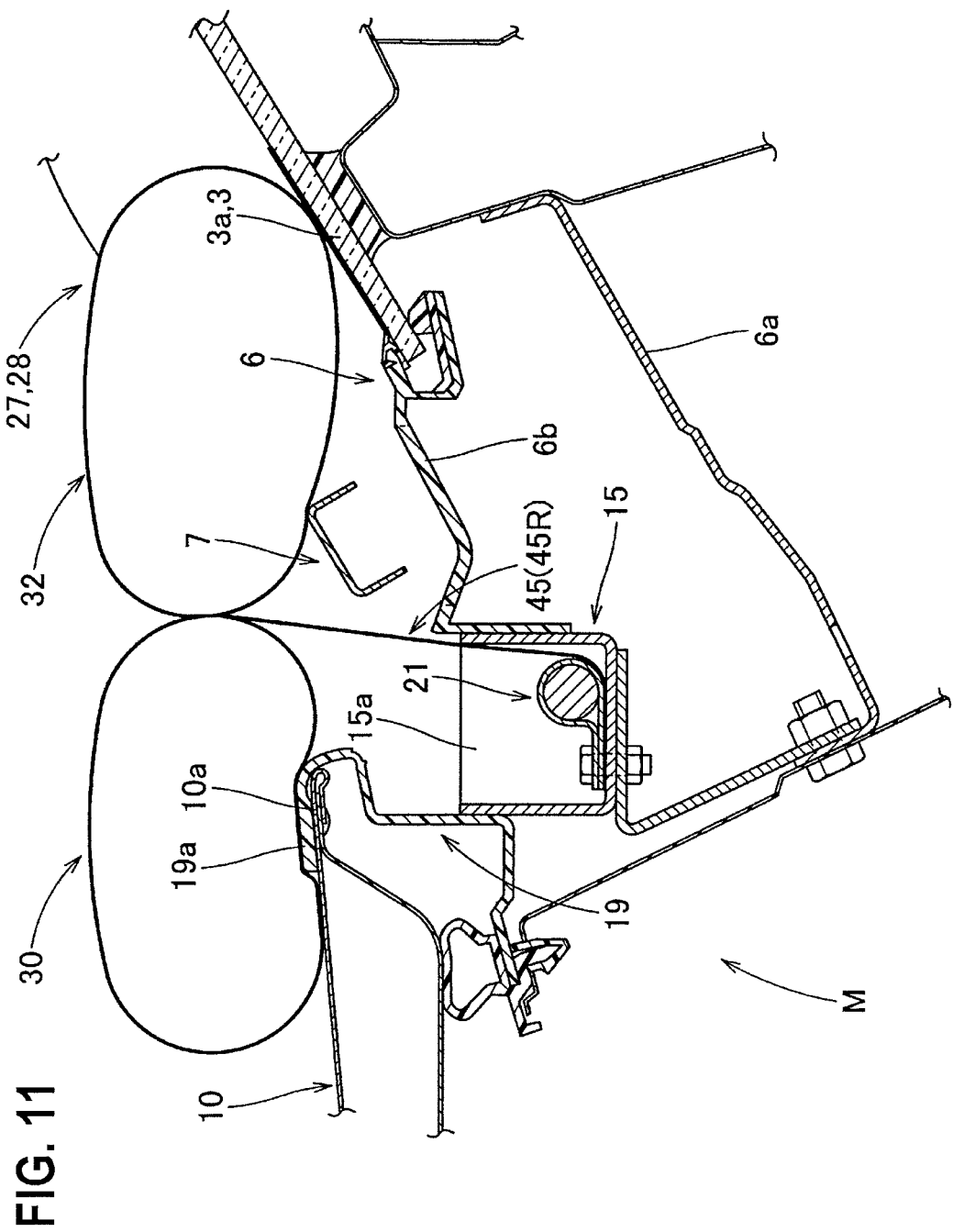
FIG. 11 is a longitudinal sectional view showing a state where the airbag of the pedestrian airbag apparatus according to the embodiment has been completely inflated.
Figure 12:
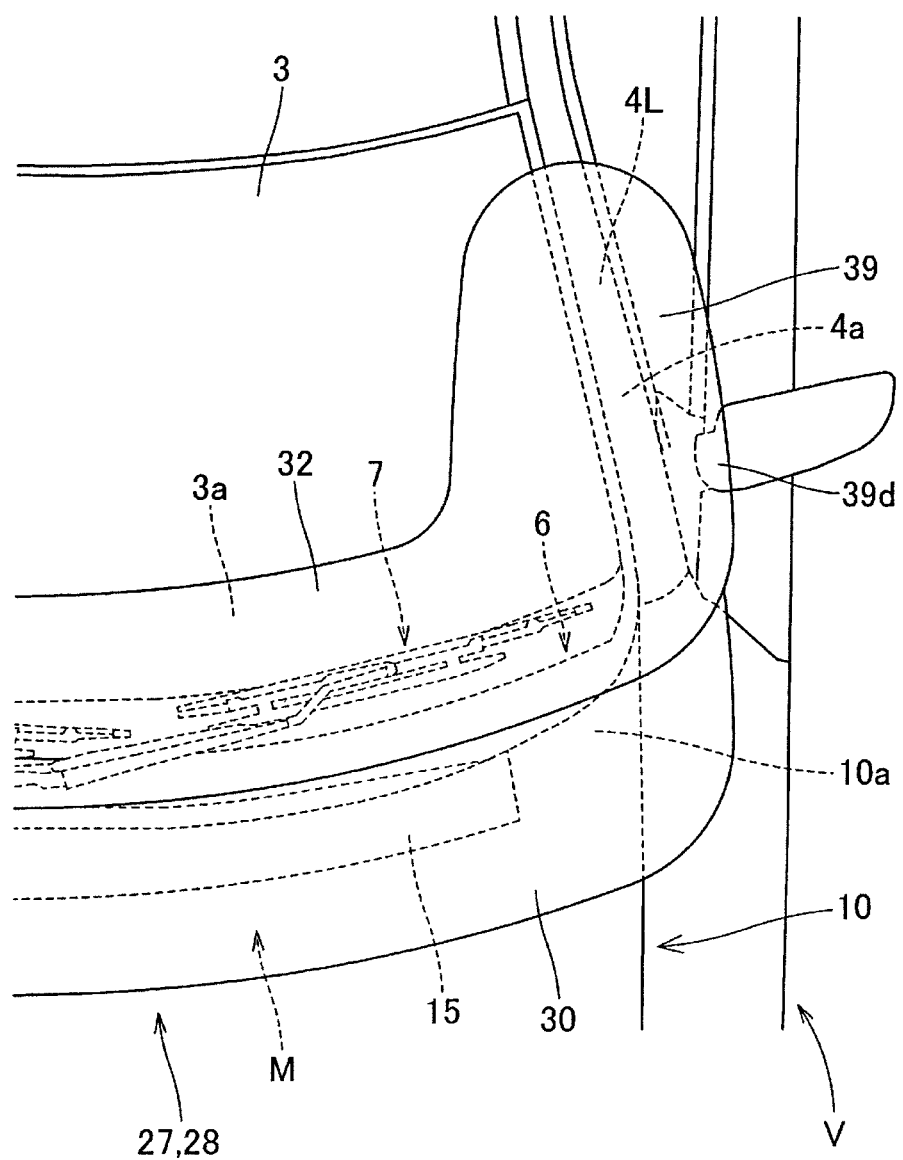
FIG. 12 is a partially enlarged plan view showing a state where the airbag of the pedestrian airbag apparatus according to the embodiment has been completely inflated.

In the airbag apparatus M of the embodiment, when the actuation circuit (not shown) detects that the vehicle V is collided with a pedestrian, based on a signal from a sensor (not shown) arranged in the front bumper 5, the inflator 21 is activated so that the inflation gas is flowed into the airbag 27, thereby inflating the airbag 27. The inflating airbag 27 pushes and opens the door portion 19a of the airbag cover 19, and then, while protruding upward from the protrusion opening 15a of the case 15 formed by opening the door portion 19a, is completely inflated to cover from the upper surface of the rear end 10a of the hood panel 10 through the upper surface of the cowl 6 to the front surfaces of the front pillars 4L and 4R (cf., a two-dot chain line in FIG. 1, and FIGS. 11 and 12).

Also, according to the airbag apparatus M of the embodiment, partitions for partitioning the transversal inflation portion 29 of the airbag 27 in the front and rear direction include the end-side partitions 36 and 36 arranged to extend from both left and right ends 29a and 29b of the transversal inflation portion 29 inward in the left and right direction and thus to block regions in front of the longitudinal inflation portions 39, or in other words, the front transversal cell section 30 of the transversal inflation portion 29, which is arranged on the front side, is configured so that both left and right ends 30a and 30b thereof block the longitudinal inflation portions 39 and 39. Therefore, upon operation of the inflator 21, the inflation gas G flowed into the front transversal cell section 30 through the gas inlet 41 is difficult to flow into the longitudinal inflation portions 39 and 39 from both left and right ends of the front transversal cell section 30, and thus, as shown in FIG. 4, after flowing into the rear transversal cell section 32 of the transversal inflation portion 29 through the gas communication passages 37 and 37 and then toward both left and right sides of the rear transversal cell section 32 along the inside thereof, is introduced into the longitudinal inflation portions 39 and 39 from both left and right ends 32a and 32b of the rear transversal cell section 32, thereby inflating the longitudinal inflation portions 39 and 39. Further, according to the airbag apparatus M of the embodiment, the end-side tethers 45 extending from the end portions 36a on the distal ends of the end-side partitions 36 are connected to the case 15 as a storage portion, thereby limiting a spacing distance of such regions from the case 15.

Specifically, according to the airbag apparatus M of the embodiment, the inflation gas G flowed into the airbag 27 through the gas inlet 41 upon operation of the inflator 21 is first introduced into the front transversal cell section 30 and as a result, the front transversal cell section 30 is inflated in a rod shape arranged substantially along in the left and right direction. At this time, the front transversal cell section 30 can be quickly arranged to cover the upper surface of the rear end 10a of the hood panel 10, because the regions near both left and right ends 30a and 30b thereof are connected to the case 15 by the end-side tethers 45 and 45 so that floating of both left and right ends 30a and 30b from the case 15 can be inhibited and thus swaying thereof can be inhibited. Then, in a state where the front transversal cell section 30 has been stably arranged to cover the upper surface of the rear end 10a of the hood panel 10, the longitudinal inflation portions 39 and 39 are inflated as the inflation gas G is flowed therein through the gas communication passages 37 and 37 and the rear transversal cell section 32, and therefore, each longitudinal inflation portion 39 can be inflated while a region, in which a proximal portion 39b thereof is located, is supported by the parts on the ends 30a and 30b of the front transversal cell section 30, which is being inflated in a rigid rod shape. Thus, each longitudinal inflation portion 39 can be inflated in a state where oscillation causing floating of an outer edge 30d thereof upward, or swaying in the left and right direction is inhibited, and as a result, can be quickly and stably arranged to cover the front surfaces of the front pillars 4L and 4R.

Therefore, according to the airbag apparatus M of the embodiment, the longitudinal inflation portions 39 are inhibited from floating from the case 15 or from fluttering upon deployment and inflation of the airbag 27, thereby quickly covering the front surfaces of the front pillars 4L and 4R.

In addition, according to the airbag 27 of the embodiment, the middle-side partition 35 is arranged between the end-side partitions 36 and 36 to delimit the front transversal cell section 30 and the rear transversal cell section 32. The middle-side partition 35 is arranged to be adjacent to the rear side of the opening 31 of the front transversal cell section 30 communicated with the gas inlet 41, and a spacing distance thereof from the case 15 is limited by the middle-side tethers 44 formed to extend from both left and right end portions 35a thereof. Specifically, according to the airbag 27 of the embodiment, because a region near and on left and right sides of the gas inlet 41 is configured so that a spacing distance thereof from the case 15 is limited by the middle tethers 44 and 44, it is possible to accurately inhibit a region (the region near the gas inlet 41), which is located on the middle side in the left and right direction of the front transversal cell section 30 and is first inflated upon initial inflation of the airbag 27, from highly floating from the case 15 due to the inflation gas flowed therein. Further, according to the airbag 27 of the embodiment, each middle-side tether 44 and each end-side tether 45 are respectively formed to extend from the end portions 35a and 36a of the middle-side partition 35 and the end-side partitions 36, or in other words, each middle-side tether 44 and each end-side tether 45 are respectively arranged to extend from both left and right edges of each of two gas communication passages 37 for communicating the front transversal cell section 30 with the rear transversal cell section 32. Specifically, according to the airbag 27 of the embodiment, both left and right sides of each of the gas communication passages 37 for communicating the front transversal cell section 30 with the rear transversal cell section 32 are configured so that spacing distances thereof from the case 15 are limited by each middle-side tether 44 and each end-side tether 45. Therefore, when the inflation gas is flowed into the rear transversal cell section 32 through the gas communication passages 37, regions near the gas communication passages 37 can be inhibited from highly floating from the case 15 and also opening state of the gas communication passages 37 can become stable, thereby stably and quickly inflating the rear transversal cell section 32.

In addition, according to the airbag apparatus M of the embodiment, the airbag 27 is configured to be folded by front-rear shrinkage folding and left-right shrinkage folding, so that, upon front-rear shrinkage folding, regions of the longitudinal inflation portions 39 are roll-folded to be rolled from the distal ends (rear ends) 39a thereof toward the lower wall portion 28a and then upon left-right shrinkage folding, the front-rear shrinkage folded bag 53 folded by front-rear shrinkage folding is folded back at a location near the inner edge 39c of each of the longitudinal inflation portions 39 and 39. Therefore, when being deployed to release the left-right shrinkage folded state upon initial inflation of the airbag 27, the region of each longitudinal inflation portion 39 can be quickly and broadly deployed in the left and right direction. In addition, because the longitudinal inflation portions 39 are folded by roll-folding to be rolled from the rear ends (distal ends 39a) thereof toward the lower wall portion 28a, when the longitudinal inflation portions 39 are deployed as the inflation gas is flowed therein, the longitudinal inflation portions 39 can be deployed along the front surfaces of the front pillars 4L and 5R while releasing the folded state. Therefore, in addition to inhibiting swaying, it is possible to prevent the longitudinal inflation portions 39 from highly floating from the front pillars 4L and 4R upon deployment and inflation, thereby quickly inflating to cover the front surfaces of the front pillars 4L and 4R.

Meanwhile, although, in the foregoing embodiment, the end-side partitions 36 formed in the airbag 27 are formed to continuously extend from the peripheral edge coupling portion 34, at which outer peripheral edges of the lower wall portion 28a and the upper wall portion 28b are stitched to each other, the end-side partitions may not be formed to be continuously extend from the peripheral edge coupling portion and accordingly, the end-side partitions may be formed with a slight gap provided between the peripheral edge coupling portion and the end-side partitions, if not allowing a large volume of inflation gas to be flowed into the longitudinal inflation portions from the front transversal cell section. Also, in the foregoing embodiment, although the end-side partitions 36 and the middle-side partition 35 are configured to directly stitch (couple) the lower wall portion 28a to the upper wall portion 28b, the end-side partitions and the middle-side partition may be configured to connect the lower wall portion to the upper wall portion with tethers interposed therebetween.

Further, in the foregoing embodiment, although the airbag apparatus is mounted in the cowl, the position, in which the airbag apparatus is mounted, is not limited to such a configuration, and accordingly, the present invention may be applied to, for example, an airbag apparatus, in which a region near the rear end of the hood panel is recessed and the airbag apparatus is received in the recessed region and therefore mounted in the hood panel itself.

What is claimed is:

1. A pedestrian airbag apparatus that is accommodated in a storage portion arranged near a rear end of a hood panel of a vehicle and at a middle side of the hood panel in a left and right direction of the vehicle between left and right front pillars, the pedestrian airbag apparatus comprising:
   a folded airbag; and
   an inflator that supplies an inflation gas to the airbag,
   wherein the airbag includes, upon completion of inflation,
      a transversal inflation portion arranged substantially along the left and right direction to cover an upper surface extending from the rear end of the hood panel to a lower portion of a front wind shield arranged on a rear side of the hood panel;
      two longitudinal inflation portions adapted to extend from both ends of the transversal inflation portion toward the rear side and to cover front surfaces of the left and right front pillars; and
      a gas inlet connected to the inflator are arranged on the transversal inflation portion,
   wherein the airbag further includes a lower wall portion arranged on a lower surface side of the airbag and an upper wall portion arranged on an upper surface side of the airbag upon completion of inflation;
   wherein the transversal inflation portion includes partitions configured to couple the lower wall portion with the upper wall portion and intermittently formed substantially along the left and right direction, and gas communication passages penetrated in a front and rear direction of the vehicle in regions between the partitions, and thus an inner region of the transversal inflation portion is partitioned into transversal cell sections arranged side by side in the front and rear direction;
   wherein the gas inlet is arranged on the front transversal cell section of the transversal inflation portion arranged on the front side of the airbag;
   wherein the front transversal cell section is arranged to cover an upper surface of the rear end of the hood panel upon completion of inflation;
   wherein the partitions include end-side partitions arranged to extend from both left and right ends of the transversal inflation portion inward in the left and right direction and thus to block front side portions of the longitudinal inflation portions; and
   wherein the airbag includes tethers limiting a spacing distance from the storage portion of the airbag by connecting proximal portion sides of the tethers to regions on distal end sides of the end-side partitions and connecting distal end sides of the tethers to the storage portion, wherein proximal ends of the tethers are fixed to the end-side partitions.

2. The pedestrian airbag apparatus according to claim 1, wherein the end-side partitions divide end portions of the transversal inflation portion in the left and right direction and the front side portions of the longitudinal inflation portions.

3. The pedestrian airbag apparatus according to claim 1, wherein the proximal ends of the tethers are fixed to the end-side partitions, by stitches at the distal end sides of the end-side partitions.

* * * * *